United States Patent [19]

Merzhanov et al.

[11] 4,161,512

[45] Jul. 17, 1979

[54] PROCESS FOR PREPARING TITANIUM CARBIDE

[76] Inventors: Alexandr G. Merzhanov, Noginsky raion, p/o Chernogolovka, ulitsa Pervaya, 1, kv. 30; Inna P. Borovinskaya, Noginsky raion, p/o Chernogolovka, ulitsa Pervaya, 17/1, kv. 9, both of Moskovskaya oblast; Gennady G. Karjuk, ulitsa D. Korotchenko, 17a, kv. 60, Kiev; Fedor I. Dubovitsky, Vorobievskoe shosse, 2b, kv. 12, Moscow; Valentina K. Prokudina, Noginsky raion, p/o Chernogolovka, ulitsa Pervaya, 16, kv. 12; Viktor I. Ratnikov, Noginsky raion, p/o Chernogolovka, ulitsa Pervaya, 24, kv. 63, both of Moskovskaya oblast; Anatoly V. Bochko, ulitsa Sergema, 42, kv. 12, Kiev; Evgeny I. Moshkovsky, ulitsa Vyshgorodskaya, 76a, kv. 18, Kiev; Semen J. Sharivker, ulitsa Zhadanovskogo, 96, kv. 7, Keiv; Sergei S. Krizhanovsky, pereulok Minsky, 28, Keiv, all of U.S.S.R.

[21] Appl. No.: 868,628

[22] Filed: Jan. 11, 1978

[30] Foreign Application Priority Data

Jan. 21, 1977 [SU] U.S.S.R. .............................. 2444251

[51] Int. Cl.² .......................................... C01B 31/30
[52] U.S. Cl. .................................... 423/440; 423/439
[58] Field of Search ............... 423/440, 439, 442, 291; 264/56; 106/43

[56] References Cited

U.S. PATENT DOCUMENTS 3,437,443  4/1969  Hertl ................................. 423/440
3,438,729  4/1969  Ohlgren ............................ 423/440

FOREIGN PATENT DOCUMENTS 617860  4/1961  Canada ................................... 423/440

OTHER PUBLICATIONS

Brauer, "Handbook of Preparative Inorganic Chemistry", vol. 2, 2nd Ed. 1965, p. 1246.

*Primary Examiner*—Edward J. Meros
*Attorney, Agent, or Firm*—Steinberg and Blake

[57] ABSTRACT

A process for preparing titanium carbide in accordance with the present invention comprises ignition of a mixture consisting of 80–88% by weight of a powder of commercial titanium and 20–12% by weight of finely divided carbon followed by an exothermal reaction of said mixture under the conditions of layer-by-layer combustion with the formation of gaseous by-products; the process is conducted in a porous casing which prevents the mixture from scattering in the course of its intensive cooling, and removing the gaseous products therethrough.

The process according to the present invention makes it posible to produce titanium carbide with a content of combined carbon approaching the stoichiometric value (19.5–19.8% by weight), the content of free carbon of 0.08% by weight and oxygen 0.1% by weight. The process according to the invention makes it also possible to use, as the starting materials, commercial products, i.e. products containing impurities.

6 Claims, No Drawings

PROCESS FOR PREPARING TITANIUM CARBIDE

BACKGROUND OF THE INVENTION

1. Field of the Application

The present invention relates to processes for the preparation of metal carbides and, more specifically, to a process for preparing titanium carbide which is useful as an abrasive, refractory and wear-resistant material in ferrous and non-ferrous metallurgy.

2. Description of the Prior Art

A process for preparing titanium carbide by reducing titanium dioxide with carbon in a protective atmosphere (hydrogen, carbon dioxide or methane) in high-temperature furnaces at a temperature within the range of from 1,700° to 2,100° C. is known in the art. To increase the content of carbon, titanium carbide is repeatedly heated with carbon.

However this process suffers from a disadvantage residing in the need to employ sophisticated power-consuming equipment, the productivity of the process equipment is low (not more than 0.5 kg/hr per one graphite-tubular furnace), and the quality of the final product is poor (the content of bound carbon being 18.0–19.5% by weight, content of free carbon 1.0 to 2.5% by weight the stoichiometric content of bound carbon being 20.0% by weight).

There is also known in the art a process for producing high-melting compounds of carbides, nitrides and borides of metals belonging to Groups IV, V and VI of the periodic system.

This process comprises mixing at least one of the above mentioned metals in equimolar ratio with one of the non-metals such as carbon, boron, nitrogen and silicon. The resulting mixture is placed in a reaction vessel which is filled with an inert gas, the reaction vessel volume substantially exceeding the volume of the reaction mixture. Then, a local heating of a small region of the reaction mixture surface area is effected by means of a heat source. As a result, a combustion process is initiated in a thin layer of the mixture of the starting components which self-propagates over the entire reaction mass. This self-propagation of combustion over the reaction mass occurs owing to the heat released in the reaction of the starting components and to the heat-transfer process. The combustion zone has a temperature within the range of from 2,500° to 4,000° C.

A disadvantage of this prior art process resides in the necessity of using high-grade starting components. Thus, in the case of powder-like titanium contaminated with oxygen, hydrogen, nitrogen and chlorine, gaseous by-products are formed during the synthesis of titanium carbide which cause scattering of the reaction mass. The reaction becomes uncontrollable. To prevent the reaction mass from scattering, is is necessary to perform the process in an inert gas atmosphere under a pressure ranging from dozens to hundreds of atmospheres. Furthermore, the presence of gaseous impurities upon cooling of the resulting titanium carbide causes contamination thereof and, hence, impaired performance characteristics of the final product, e.g. abrasive properties.

Another disadvantage of the afore-described prior art process resides in the impossibility of producing titanium carbide on a commercial scale.

SUMMARY OF THE INVENTION

It is an object of the present invention to provide a process for producing titanium carbide which will make it possible to improve the purity of the final product.

It is another object of the invention to provide a process which permits the use of contaminated starting products, i.e. commercial starting products.

These objects are accomplished by a process for preparing titanium carbide by heating of a mixture consisting of 80–88% by weight of commercial titanium powder and 20–12% by weight of a finely divided carbon, followed by an exothermal reaction of said mixture under the conditions of combustion in layers with the formation of gaseous by-products in accordance with the present invention the process is conducted in a porous casing which prevents the mixture from scattering upon intensive cooling of the casing, and removal of said gaseous products therethrough.

As a casing material use can be made of refractory porous ceramics consisting of 1 part by weight of alumina and 2 parts by weight of magnesia with the porosity of 15%, or consisting of 1 part by weight of boron nitride and 2 parts by weight of magnesia with the porosity of 20%. In addition, the casing can be made of porous sintered titanium carbide with the porosity of 30%, or porous graphite with the porosity of 20%.

In order to minimize partial sintering of titanium carbide and to obtain the same in powder form requiring no further grinding, titanium carbide is added to the starting mixture in an amount ranging from 20 to 40% by weight of the total mixture.

DETAILED DESCRIPTION OF THE INVENTION

The process according to the present invention is performed in the following manner.

As the starting components use is made of a finely-divided carbon and titanium powder with a particle size of below 300 mcm, containing 2 to 3% by weight of impurities such as oxygen, hydrogen, sulphur.

A mixture of the titanium powder and finely-divided carbon with the content of the latter in said mixture of from 12 to 20% by weight is placed into a porous casing, whereafter the mixture is compacted to a relative density of 0.4–0.5 (ratio of the effective density to the theoretical one). Ignition of the reaction mixture is effected by heating with a tungsten or molybdenum coil to a temperature sufficient for initiation of an exothermal reaction. Ignition may be effected by any other source of thermal impulse. As a result, inflammation of a thin layer of the mixture surface occurs with a subsequent propagation of the combustion process over the entire reaction mixture. Temperature in the combustion zone varies from 2,500° to 3,000° C. During the combustion, gaseous by-products are formed from the contaminants incorporated in the starting products. These gaseous by-products, along with the air occluded in pores of the reaction mixture, cause, at a temperature within the range of from 2,500° to 3,000° C., the formation of high pressure of the gases in the reaction mixture (ranging from dozens to hundreds of atmospheres). This high pressure results in scattering of the reaction mixture. To avoid the detrimental effect of the resulting gaseous mass, the combustion process (ignition and subsequent burning) is conducted in a casing which should have sufficient mechanical strength to preclude scattering of the reaction mixture at high process temperatures. It must be sufficiently porous to allow the gases to pass therethrough and sufficiently inert to avoid chemical reaction with the starting components under the process conditions.

As a material for such a casing use can be made of graphite, high-melting ceramics based on alumina, titanium carbide, silicon carbide or boron nitride with porosity of from 15 to 30%.

Porous character of the casing substantially impairs its durability, so that it is necessary to cool the casing during the synthesis of titanium carbide.

In the case of direct cooling of the casing per se, the latter is placed in a sealed chamber and then water is admitted into a tubular cooler encircling the casing. In addition, the sealed chamber may be cooled. In this case it is necessary to ensure a direct contact between the walls of the sealed chamber and the casing; the sealed chamber walls are provided with longitudinal grooves to ensure removal of the gaseous products formed during the process through the porous casing.

Removal of said gaseous products from the sealed chamber is effected by reducing their pressure to 0.1 atm.g., not below, followed by setting them under vacuum.

Titanium carbide prepared by the process according to the present invention has a purity grade which is higher, by one order of magnitude, than the purity grade of the starting components.

The process according to the present invention makes it possible to obtain titanium carbide with a content of bound carbon approaching the stoichiometric value, i.e. 19.5-19.8% by weight with the content of free carbon of 0.08% by weight and content of oxygen of 0.1% by weight. Grains of the resulting titanium carbide comprise single-crystalline or non-porous dense polycrystalline bodies having a high degree of isometricity (ratio of the grain length to width is 1.0-1.15).

The data illustrating hydraulic classification of the resulting titanium carbide powders are given hereinbelow;

| grain size, mcm | percentage of grains of a particular size |
| --- | --- |
| 60-40 | 15.2 |
| 40-28 | 20.0 |
| 28-20 | 14.6 |
| 20-14 | 10.7 |
| 14-10 | 12.0 |
| 10-7 | 10.7 |
| 7-5 | 5.6 |
| 5-3 | 3.1 |
| 3-0 | 1.8 |

Powders of titanium carbide are used for manufacturing abrasive grinding wheels intended for machining of ferrous and non-ferrous metals or alloys based thereon. Replacement of abrasive wheels made of electrocorundum or silicon carbide with those made of titanium carbide makes it possible to increase the grinding productivity by 5-8 times and improve the surface finish by 1-3 classes. The use of titanium carbide as fillers in abrasion pastes instead of diamond makes it possible to increase labour productivity by 1.5-2 times, improve the surface finish by 1-2 classes, reduce charging of the abrasive into the surface ground at the abrasive machining of non-ferrous metals.

For a better understanding of the present invention some specific Examples of the process for producing titanium carbide are given hereinbelow.

EXEMPLE 1

1 kg of a mixture consisting of 12% by weight of carbon black with the ash content of up to 0.2% and 88% by weight of titanium powder with a particle size of up to 100 mcm and the principal compound content of 98% by weight is charged into a casing (bucket) of a refractory porous ceramic consisting of 1 part by weight of of alumina and 2 parts by weight of magnesia. Porosity of the ceramic is 15%. The reaction mixture is densified to the density of 1.95% g/cm$^3$. The bucket with the mixture is placed into a sealed chamber with an annular tubular cooler provided in the inner wall thereof. Water supply rate is 15 m$^3$/min. Ignition of a thin layer of the reaction medium is effected by means of a tungsten coil set under voltage of 40-60 V and the current of 60-80 A for 1-2 sec; the coil is heated to the temperature of from 2,500° to 3,000° C. Removal of gaseous by-products formed during the reaction is effected through the porous ceramic bucket into the sealed chamber. In said chamber pressure is increased up to 20 atm over the period of combustion. On completion of the preparation of titanium carbide pressure of the gaseous by products in said chamber is released down to 0.1 atm.g., not below, and then the chamber is set under vacuum.

The yield of the desired product, i.e. titanium carbide, is 98.3% by weight; the content of bound carbon is 11.8% by weight, the content of free carbon is 0.01% by weight, the content of oxygen is 0.1% by weight.

EXAMPLE 2

10 kg of a mixture consisting of 16% by weight of carbon black with the ash content of up to 0.2% and 84% by weight of titanium powder with a particle size of up to 200 mcm and the content of the principal compound of 98% by weight are charged into a bucket made of refractory porous ceramics consisting of 1 part by weight of boron nitride and 2 parts by weight of magnesia and densified to the density of the reaction mass of 1.87 g/cm$^3$. Porosity of ceramics is 20%.

The process is further conducted as described in the foregoing Example 1. The yield of the desired product, i.e. titanium carbide, is 98.5% by weight, the content of bound carbon is 15.8% by weight, the content of free carbon is 0.02% by weight, the content of oxygen is 0.1% by weight.

EXAMPLE 3

20 kg of a mixture consisting of 20% by weight of carbon black with the ash content of 0.2% and 80% by weight of titanium powder with the particle size of up to 300 mcm and the content of the principal compound of 97.5% by weight are charged into a ceramic bucket (casing) of porous sintered titanium carbide and the reaction mixture is densified to the density of 1.8 g/cm$^3$. Porosity of ceramics is 30%. The bucket with the reaction mixture is placed into a sealed chamber comprising a steel chamber with longitudinal grooves provided at the inner surface thereof for the removal of the gaseous by-products formed during the reaction. Pressure of the gaseous by-products discharged from the sealed chamber is released to not below 0.1 atm.g. with subsequent setting under vacuum. Cooling of the ceramic bucket is effected by means of supply of water into the cooling jacket of the sealed chamber which is provided at the outer surface of the chamber. The rate of water supply into the cooling jacket is 12–17 m³/min. A loop made of a tungsten wire with a diameter of 1–2 mm is placed into the reaction mass. Ignition of a thin layer of the reaction mixture is effected by supplying electric voltage of 40–60 V to the loop at a current of 60–80 A. Further stages of the process are carried out in the manner described in the foregoing Example 1.

The resulting product comprises a compact grey mass which is readily broken under a mechanical force. The surface of the compact mass is coated with a loose layer which is readily removed manually. These "wastes" comprise 1–2% by weight of the total mass.

The yield of the desired product, viz. titanium carbide is 98% by weight; the content of bound carbon is 19.7% by weight; the content of free carbon is 0.08% by weight; and the content of oxygen is 0.1% by weight.

Titanium carbide thus-produced after classification into fractions is used as an abrasion-grinding powder for dressing operations in grinding of ferrous and non-ferrous metals. Tests of abrasive properties evaluated by take-off of the sample upon grinding thereof for 10 minutes under the load of 0.5 kg/cm² related titanium carbide with a fineness of 28–20 (i.e. particle size of the grinding powder of titanium carbide is within the range of from 28 to 20 mcm) have shown that an average take-off from a sample of carbon steel with a Rockwell hardness of 58–61 units is 4.3 mg upon grinding with titanium carbide prepared by the process according to the present invention, whereas the take-off from the same steel upon grinding with titanium carbide prepared by the carbon-heat process is 2.1 mg.

EXAMPLE 4

13 kg of a mixture consisting of 20% by weight of carbon black with an ash content of up to 0.2% and 80% by weight of titanium powder with a particle size of up to 100 mcm and of the content of the principal product of 98% by weight with the additive of 2.5 kg of titanium carbide are charged into a graphite bucket with the porosity of 20%. Density of the reaction mixture is 1.8 g/cm³.

The process is further carried out in a manner similar to that described in the foregoing Example 3.

Dilution of the reaction mixture with the desired product lowers the synthesis temperature, prevents titanium carbide from partial sintering and enables production thereof in a powder-like form thus avoiding any subsequent crushing.

The yield of the desired product, i.e. titanium carbide, is 97.5%, by weight; the content of combined carbon is 19.8 by weight; the content of free carbon is 0.08% by weight; the content of oxygen is 0.1% by weight.

What is claimed is:

1. Method of producing titanium carbide, which comprises locally igniting a portion of a mixture consisting of 80–88% by weight of commercial titanium powder and 20–12% by weight of finely divided carbon, thus causing an exothermal reaction of said mixture whereby under the conditions of layer-by-layer combustion the entire mixture is heated to reaction with the formation of gaseous by-products, the process being carried out in an inert refractory porous casing having a porosity of 15–30%, thereby preventing said mixture from scattering upon an intensive cooling thereof and permitting removal of said gaseous products through said porous casing, thus forming titanium carbide of high purity with the combined carbon content approaching the stoichiometric value.

2. The method of claim 1, wherein the casing is formed of refractory porous ceramics consisting of 1 part by weight of alumina and 2 parts by weight magnesia with the porosity of 15%.

3. The method of claim 1, wherein the casing is formed of refractory porous ceramics consisting of 1 part by weight of boron nitride and 2 parts by weight of magnesia with the porosity of 20%.

4. The method of claim 1, wherein the casing is formed of porous sintered titanium carbide with the porosity of 30%.

5. The method of claim 1, wherein the casing is formed of porous graphite with the porosity of 20%.

6. The method of claim 1, wherein prior to ignition titanium carbide is added to the mixture in an amount of 20–40% by weight of said mixture.

* * * * *